Aug. 12, 1924.
J. VAN MOHR
SPRING TIRE
Filed May 26, 1923
1,504,797
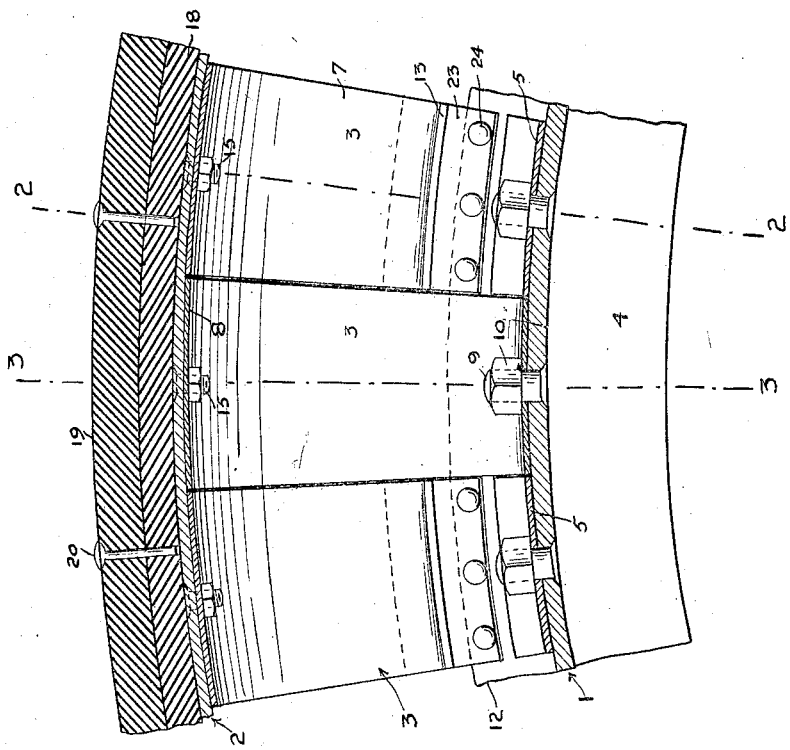
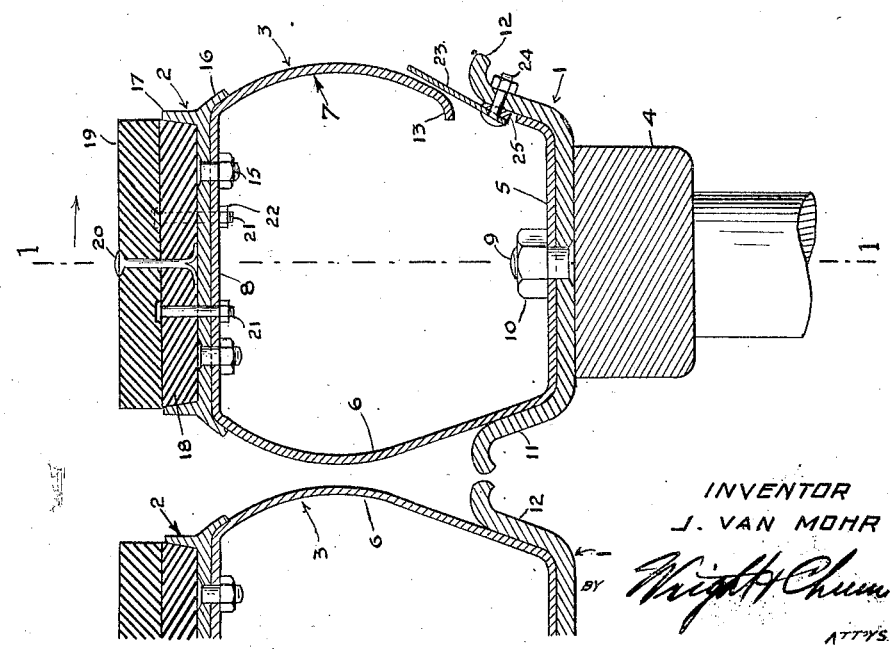
INVENTOR
J. VAN MOHR
BY
ATT'YS Patented Aug. 12, 1924.

1,504,797

UNITED STATES PATENT OFFICE.

JOSEPH VAN MOHR, OF SAN FRANCISCO, CALIFORNIA.

SPRING TIRE.

Application filed May 26, 1923. Serial No. 641,626.

*To all whom it may concern:*

Be it known that I, JOSEPH VAN MOHR, a citizen of the United States, residing at San Francisco, in the county of San Francisco and State of California, have invented new and useful Improvements in Spring Tires, of which the following is a specification.

The present invention relates to improvements in tires for automobiles and other vehicles and resides in the provision of a simply constructed, inexpensive, strong, durable and resilient tire which is composed of a plurality of spring metal sections constructed and arranged in a novel manner.

An object of the invention is to provide a puncture proof light, compact tire of the character described which may be readily applied to wheels of different kinds without necessitating materially changing the construction of said wheels.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a cross sectional view through a tire constructed in accordance with my invention, taken on line 1—1 of Fig. 2.

Fig. 2 represents a transverse sectional view of the tire of my invention, taken on line 2—2 of Fig. 1.

Fig. 3 is a fragmentary cross sectional view taken on line 3—3 of Fig. 1.

Referring to the embodiment of the invention shown in the accompanying drawing, the tire comprises an inner rim 1 and an outer rim 2, joined by a plurality of independent spring metal sections 3. The inner rim is to be secured in any suitable manner to the felly 4, of an automobile wheel so as to provide a means for attachment of the metallic tire sections 3. Each of the sections 3 comprises a band of thin resilient metal, for example, high grade steel, an inch or more in width, depending on the size of the wheel and the weight and strength desired. The bands are bent into a substantially circular form so as to provide a base portion 5 adapted to extend across and within the rim 1, outwardly bulging or curving side portions 6 and 7 and an outer or tread portion 8 joining the portions 6 and 7, which portion 8 may be substantially flat as shown. The base portion 5 is secured by bolts and nuts 9 and 10 respectively, to the inner rim 1. The inner ends of the portions 6 extend along and engage against the inner sides of the flange 11 of the inner rim. The side portion 7 terminates in spaced relation to the corresponding flange 12 and the adjacent end of the base portion 5, and the free end of the portion 7 is curved as at 13. In arranging the sections they are mounted so that first one of them has the portion 7 on one side of the tire and the next on the opposite side and so on so that the resiliency of the tire is equalized.

The outer rim 2 is secured by countersunk bolts 15 to the outer portions 8 of the sections 3, and said rim is provided with inwardly extending flanges 16 which engage and conform to the curvatures of the portions 6 and 7 of said sections 3. Similar flanges 17 extend outwardly from the rim and receive between them a strip of compressible substance 18 such as brake lining material. The strip is preferably of a thickness such that it comes substantially flush with the outer edges of the flanges 17. An outer strip 19 is secured to the strip 18 by split rivets 20 which extend through both strips and spread where engaged with the rim 2. The strip 18 is secured to the rim by bolts 21 which extend through the strip 18, rim and section 3, and have nuts 22 on their lower ends. This form of tread is economical and such that slipping or skidding is prevented.

A tire made up in accordance with the invention, as a unit, including the two rims, may be readily applied to vehicle wheels of various makes without requiring changes in the construction of the wheels, the inner rim being constructed in each instance to fit the particular wheel. Each section under load, will compress and the side portions 6 and 7 will bow outwardly. The portion 7 will yield and move inwardly slightly, due to its being spaced at its end 13 from contact with the rim. This yielding action will provide for considerable resiliency and by having the sections arranged with the side 7 first on one and then on the other side of the tire, the action is so equalized that the tire will not yield on one side more than on the other, and the desired resiliency is provided nevertheless. The sections 3 are comparatively close to one another so as to exclude as much dirt and dust as is possible, there being just sufficient clearance to permit compression and expansion. The portions 7 extend downwardly into the rim on the inner sides of the flange 12 sufficiently to provide as little space as possible through which dirt, stones and the like might enter the tire. By making the sections of light, high grade steel, the entire tire may be made comparatively light and yet strong and durable.

The space between the ends 13 and the rim 1 provide for access to the nuts 10 with a wrench, in order to remove the sections 3 when desired. This space is normally closed by an annular plate 23 bolted as at 24 to the rim flange 12, said plate being spaced from the sections 3 so as not to interfere with the movement thereof under compression. Washers 25 are mounted on the bolts 24 and may be removed to change the spacing of the plate or additional washers added for the same purpose.

I claim:

1. A vehicle tire comprising an inner rim, an outer rim, a plurality of spring metal sections secured to and interposed between the rims, each of said sections being in substantially circular form and of one piece of material, with the free ends thereof spaced from one another, said sections being arranged with the spaced ends alternating on opposite sides of the rim.

2. A vehicle tire comprising an inner rim, an outer rim, a plurality of resilient metal sections in substantially circular form with their ends spaced apart being mounted between said rims and fastening means for securing the sections to the rims, the space between the ends of said sections permitting access to the fastening means.

3. A vehicle tire comprising an inner rim, an outer rim, a plurality of resilient metal sections in substantially circular form with their ends spaced apart being mounted between said rims, fastening means for securing the sections to the rims, the space between the ends of said sections permitting access to the fastening means, and an annular plate removably attached to the inner rims and closing said space.

4. A vehicle tire comprising an inner rim, an outer rim, a plurality of resilient metal bands extending transversely between the rims, each band being of substantially annular form with its ends spaced apart on the sides of the tire, means for securing each band to the rims and a tire supported on the outer rim.

5. A vehicle tire comprising an inner rim, an outer rim, a plurality of resilient metal bands extending transversely between the rims, each band being of substantially annular form with its ends spaced apart on the sides of the tire, means for securing each band to the rims and a tire supported on the outer rim, said bands having their spaced ends alternating on opposite sides of the tire.

JOSEPH VAN MOHR.